(12) United States Patent
Klappert et al.

(10) Patent No.: US 11,216,073 B2
(45) Date of Patent: Jan. 4, 2022

(54) SYSTEMS AND METHODS FOR DISPLAYING MEDIA ASSETS ASSOCIATED WITH HOLOGRAPHIC STRUCTURES

(71) Applicant: Rovi Guides, Inc., San Jose, CA (US)

(72) Inventors: Walter R. Klappert, North Hollywood, CA (US); Jason W. Conness, Pasadena, CA (US); Todd Mariani, Philadelphia, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/689,787

(22) Filed: Nov. 20, 2019

(65) Prior Publication Data

US 2020/0159335 A1  May 21, 2020

Related U.S. Application Data

(63) Continuation of application No. 16/127,859, filed on Sep. 11, 2018, now Pat. No. 10,503,267, which is a continuation of application No. 14/634,589, filed on Feb. 27, 2015, now Pat. No. 10,101,816.

(51) Int. Cl.
| | |
|---|---|
| G06F 3/01 | (2006.01) |
| G03H 1/00 | (2006.01) |
| G03H 1/22 | (2006.01) |
| G06F 3/03 | (2006.01) |
| H04N 21/482 | (2011.01) |
| H04N 21/422 | (2011.01) |
| H04N 21/442 | (2011.01) |
| H04N 21/47 | (2011.01) |

(52) U.S. Cl.
CPC .......... *G06F 3/017* (2013.01); *G03H 1/0005* (2013.01); *G03H 1/2249* (2013.01); *G06F 3/0304* (2013.01); *H04N 21/42204* (2013.01); *H04N 21/44218* (2013.01); *H04N 21/47* (2013.01); *H04N 21/4821* (2013.01); *G03H 2001/0061* (2013.01)

(58) Field of Classification Search
CPC ... G06F 3/017; G06F 3/0304; H04N 21/4821; H04N 21/42204; H04N 5/44543; H04N 21/44218; G03H 1/2249; G03H 1/0005; G03H 2001/0061
See application file for complete search history.

(56) References Cited

U.S. PATENT DOCUMENTS

| | | | |
|---|---|---|---|
| 6,005,597 A | 12/1999 | Barrett | |
| 6,795,972 B2 | 9/2004 | Rovira | |
| 7,124,356 B1 | 10/2006 | Alsafadi | |
| 9,760,165 B2 * | 9/2017 | Kubota | G06F 3/01 |
| 2008/0072152 A1 * | 3/2008 | Crow | G06F 3/0484 |
| | | | 715/716 |

(Continued)

*Primary Examiner* — Andrey Belousov
(74) *Attorney, Agent, or Firm* — Haley Guiliano LLP

(57) ABSTRACT

Methods and systems are described for improved techniques for consuming and interacting with media content. Specifically, a media guidance application may present a holographic structure using a holographic interface. Moreover, the media guidance application may monitor the user and/or area about the holographic interface for user interactions that may cause the media guidance application to alter the holographic structure based on a user interaction. The media guidance application may also after altering the holographic structure, generate for display a media asset associated with the holographic structure.

18 Claims, 5 Drawing Sheets

(56) References Cited

U.S. PATENT DOCUMENTS

2013/0024796 A1* 1/2013 Seo ..................... G06F 3/04817
 715/769
2013/0038528 A1* 2/2013 Fein ........................ G06F 3/011
 345/156

* cited by examiner

SYSTEMS AND METHODS FOR DISPLAYING MEDIA ASSETS ASSOCIATED WITH HOLOGRAPHIC STRUCTURES

CROSS-REFERENCE TO RELATED APPLICATION

This application is a continuation of U.S. patent application Ser. No. 16/127,859 filed Sep. 11, 2018, which is a continuation of U.S. patent application Ser. No. 14/634,589 filed Feb. 27, 2015, now U.S. Pat. No. 10,101,816. The disclosure of each is hereby incorporated by reference herein in their entirety.

BACKGROUND

Media content is increasingly available on a plurality of user devices (e.g., televisions, smartphones, computers, etc.). However, while many of these devices allow users to input commands using various methods (e.g., physical buttons, touchscreens, voice recognition, etc.), the devices are nonetheless limited to presenting content via a traditional display screen. While some traditional devices and input schemes may be suitable for many types of content, users are increasingly interested in other ways of consuming and interacting with media content.

SUMMARY

Accordingly, methods and systems are described herein for improved techniques for consuming and interacting with media content. Specifically, a media guidance application may present a holographic structure using a holographic interface. Moreover, the media guidance application may monitor the user and/or area about the holographic interface for user interactions that may cause the media guidance application to alter the holographic structure based on a user interaction. For example, a media guidance application may generate for display a holographic structure that serves as a media listing for a particular movie. In order for a user to access the movie, the media guidance application may require the user to interact with the holographic structure.

In some aspects, a media guidance application may generate for display a holographic structure, wherein the holographic structure has a determined set of coordinates that identifies the holographic structure in a three-dimensional space. For example, the coordinates may identify the bounds of the holographic structure as perceived by a user. The media guidance application may then detect a user interaction with a portion of the holographic structure. For example, the media guidance application may detect a user attempting to perform a ripping, striking, pushing, or pulling motion on the holographic structure. In response to the user interaction, the media guidance application may increase the holographic structure's perceived surface area while maintaining the holographic structure's perceived volume, by changing a coordinate of the set of coordinates that identifies the holographic structure. For example, in response to detecting the motion, the media guidance application may alter the bounds of the holographic structure that the user perceives the holographic structure as being ripped, split, broken, etc. The media guidance application may further generate for display a media asset associated with the holographic structure. For example, the alteration of the bounds of the holographic structure as perceived by a user may reveal additional media content available to the user (e.g., a movie associated with the holographic structure) within the shell of the torn apart (or partially torn apart) holographic structure.

For example, the media guidance application may generate for display a representation of an actor that is featured in a movie. The media guidance application may then monitor for user interactions (e.g., a ripping motions) within a particular proximity of the holographic structure presented by a holographic interface. In response to detecting a user interaction, the media guidance application may cause a part of the actor to split in two. Accordingly, the media guidance application provides intuitive controls that may allow a user to virtually "rip" a holographic structure in order to access additional media content.

In some embodiments, the media guidance application may identify a type of the user interaction and cross-reference the type with a database listing types of user interactions that correspond to modifications to the holographic structure to determine whether or not to increase the holographic structure's perceived surface area while maintaining the holographic structure's perceived volume. For example, the media guidance application may determine, based on the cross-reference, to cause the holographic structure to appear split in two. The media guidance application may also determine the portion of the holographic structure to which the "ripping motion" was applied, and, as a result, may cause that portion to appear split.

In some embodiments, the media guidance application may identify a velocity of the user interaction and cross-reference the velocity with a database listing velocities of user interactions that correspond to modifications to the holographic structure to determine whether or not to increase the holographic structure's perceived surface area while maintaining the holographic structure's perceived volume. For example, the media guidance application may only modify the holographic structure if the speed of the motion reaches a threshold value and the direction does not exceed a specific number of degrees from a forward motion as calculated from the user's perspective.

In some embodiments, the media guidance application may cross-reference the holographic structure with a database listing media assets associated with holographic structures to determine the media asset to generate for display. For example, if the holographic structure represents an animal (e.g., a dog), the media guidance application may access the database to determine which media assets are associated with a representation of a dog. The media guidance application may select a media asset from the list to present to the user.

In some embodiments, the media guidance application may, after increasing the holographic structure's perceived surface area while maintaining the holographic structure's perceived volume, automatically decrease the holographic structure's perceived surface area while maintaining the holographic structure's perceived volume back to the originally sized surface area based on a threshold time. For example, if the holographic structure, as described above, represents a dog and the media guidance application detects that a user has used a pulling apart motion to open the dog's mouth, the media guidance application may, after 30 seconds, close the dog's mouth. In this instance the threshold time is 30 seconds.

In some embodiments, the media guidance application may receive a request for a plurality of holographic structures, in which each holographic structure of the plurality of holographic structures corresponds to a respective media asset. For example, the media guidance application may present multiple media asset identifiers to a user. The media guidance application may detect that a user requested more information about two media assets based on the user's interactions with the media asset identifiers. As a result, the media guidance application may generate for display multiple holographic structures, each being associated with a single media asset. For example, a first movie may feature "Sylvester Stallone" and a second movie may feature "Keanu Reaves." The media guidance application may determine the featured actors of those movies and generate for display two holographic structures (e.g., "Sylvester Stallone" and "Keanu Reaves," respectively).

It should be noted, the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
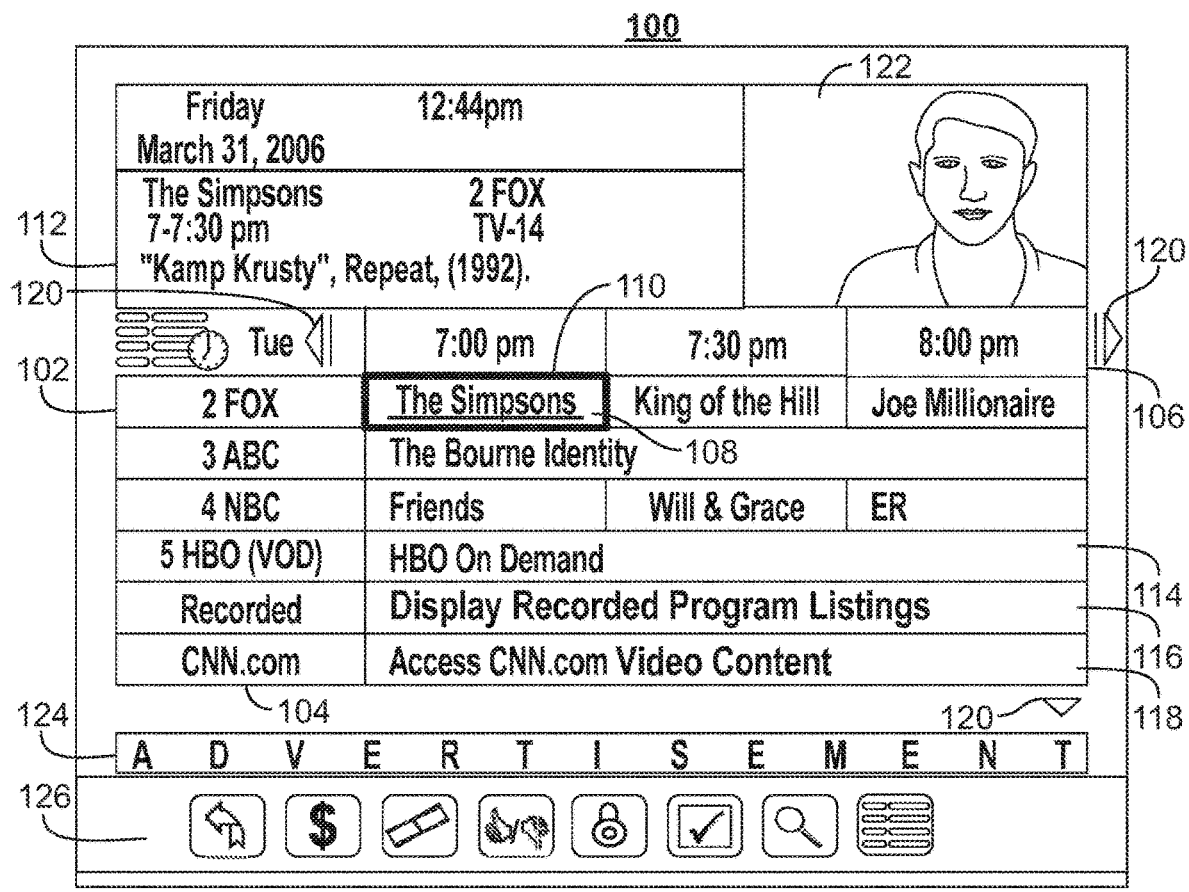
FIG. 1 shows an illustrative example of a media guidance display that may be presented in accordance with some embodiments of the disclosure.

Methods and systems are described herein for improved techniques for consuming and interacting with media content. Specifically, a media guidance application may present a holographic structure using a holographic interface. Moreover, the media guidance application may monitor the user and/or area about the holographic interface for user interactions that may cause the media guidance application to modify the appearance of the holographic structure.

As referred to herein, a "media guidance application" or "guidance application" is an application that allows users, through an interface, to efficiently navigate content selections and easily identify content that they may desire. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRS) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating, the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
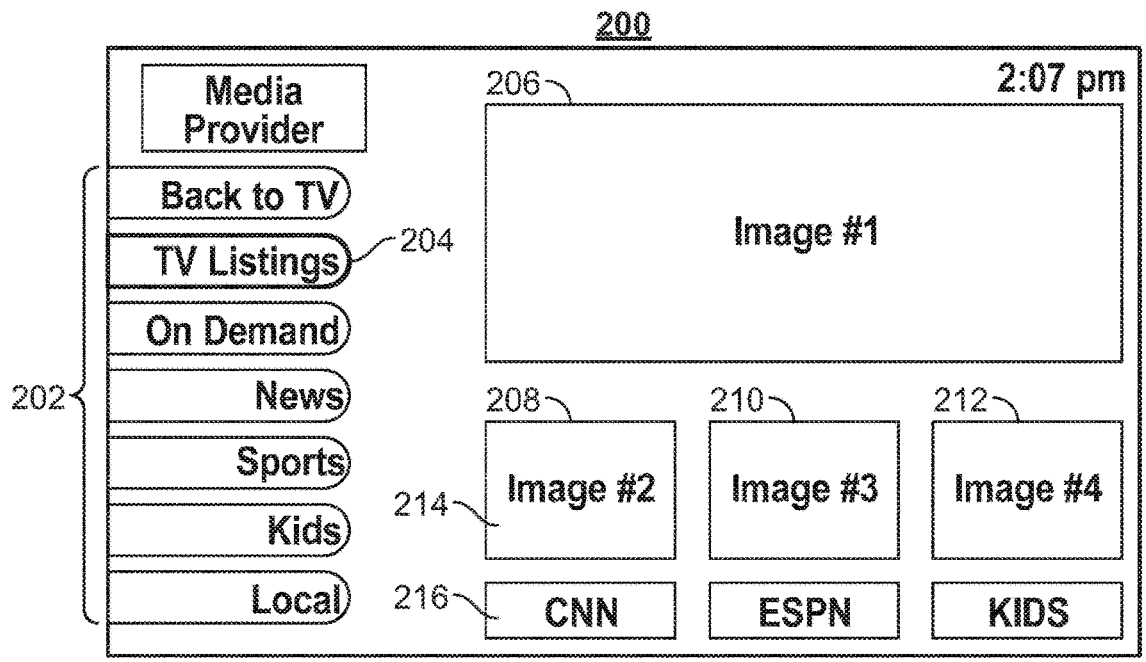
FIG. 2 shows another illustrative example of a media guidance display that may be presented in accordance with some embodiments of the disclosure.

FIGS. 1-2 show illustrative display screens that the media guidance application may generate for display to a user so that the media guidance application may receive from the user a command to instantiate a holographic structure. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button. (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. In some embodiments, display 100 may appear to a user as holographic media content. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HPO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functional ties are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment device. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. In some embodiments, display 200 may appear to a user as holographic media content. For example, a media guidance application may generate a presentation of display 200 as a three-dimensional shape (e.g., a cube), in which display 200 appears on one or more faces of the shape.

Display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Display 200 also includes selectable options 222 through 234 that are related to the presentation of holographic media content. In some embodiments, display 200 may represent a set-up menu for presentation of holographic media content. For example, in some embodiments, display 200 may be reachable by navigating another menu. (e.g., accessible by selecting selectable option 222). In display 200, selectable option. 222 is currently selected. In response, the media guidance application has presented media assets 206, 208, 210, and 212. For example, in response to a user selection, one or more of media assets 206, 208, 210, and 212 may be presented as holographic media content.

Figure 3:
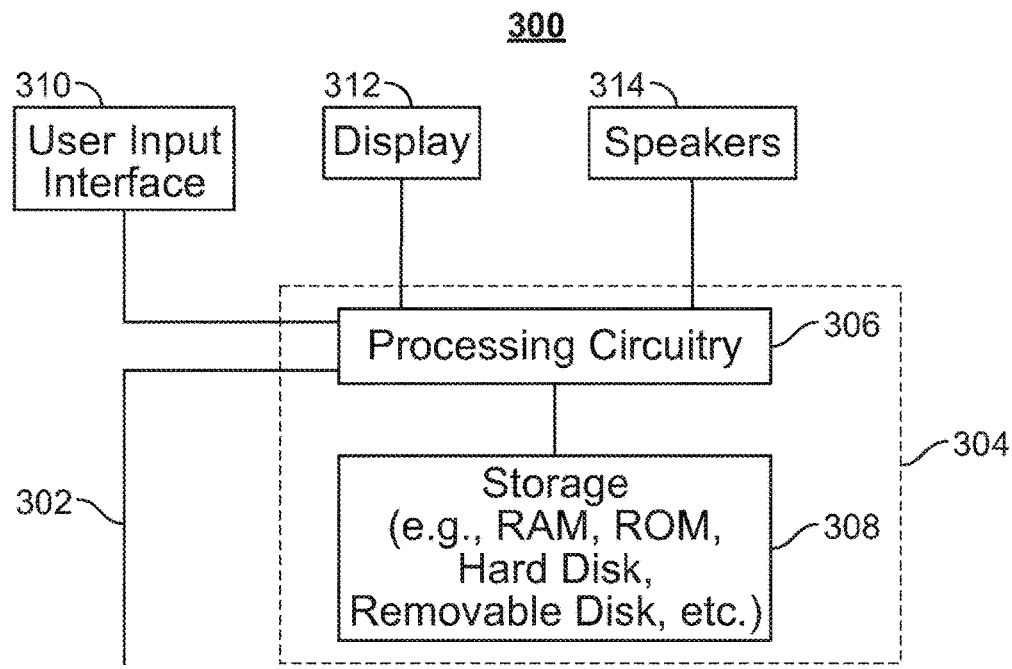
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what, action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
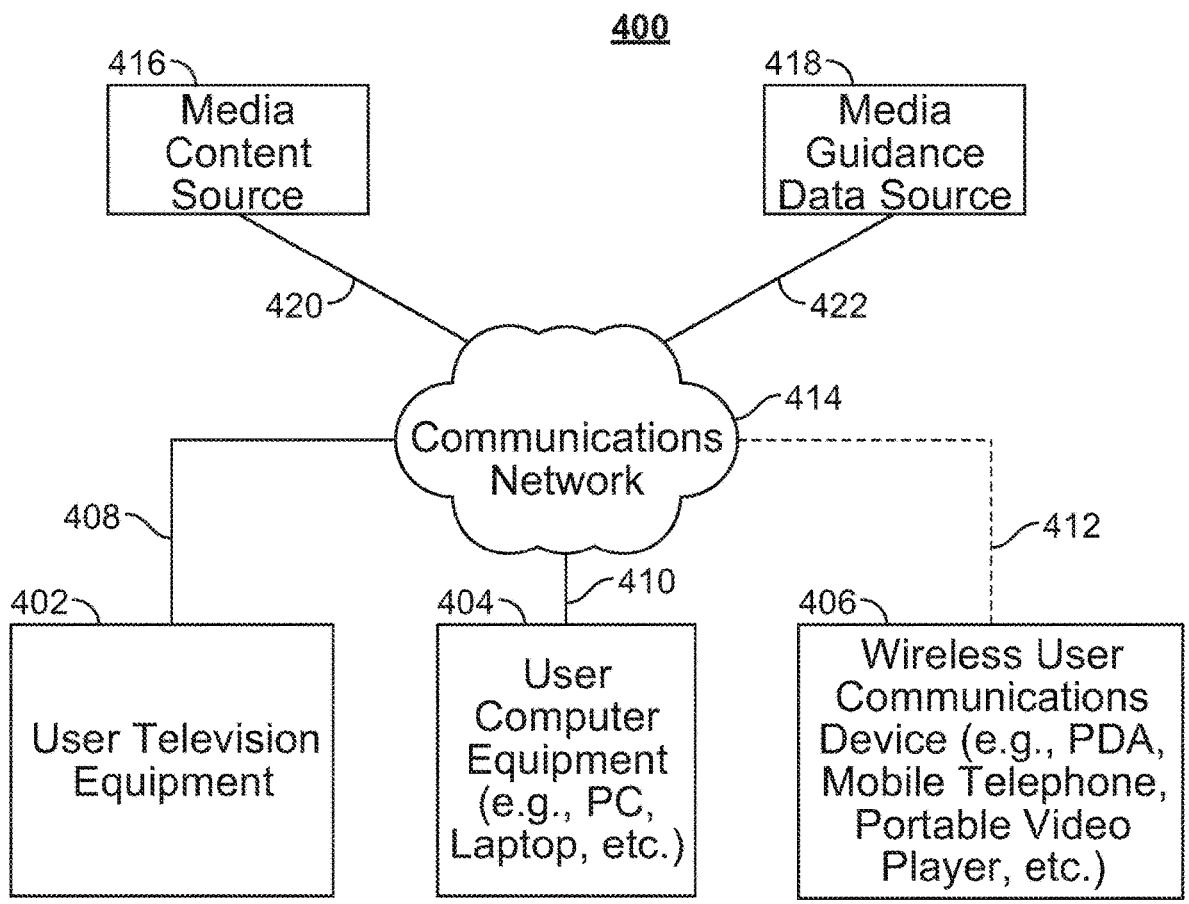
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, is desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment. 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed. (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFEIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application of of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, a media guidance application may generate for display (e.g., via display 312 (FIG. 3)) a holographic structure, where the holographic structure has a determined set of coordinates that identifies the holographic structure in a three-dimensional space. In general, holography is a technique which enables three-dimensional images to be made. It involves the use of a laser, interference, diffraction, light intensity recording and suitable illumination of the recording. The image changes as the position and orientation of the viewing system changes in exactly the same way as if the object were still present, thus making the image appear three-dimensional.

For example, a media guidance application may access a database listing holographic structures and data needed to generate for display the respective holographic structures including the coordinates that identify each holographic structure. The database may be located in storage 308 (FIG. 3), at media guidance data source 418 (FIG. 4), or at media content source 416 (FIG. 4). If the database is located at media guidance data source 418 or media content source 416, the media guidance application may access the database via communications network 414. Each holographic structure in the database may represent a specific object (e.g., a person, animal, or plant). The media guidance application may retrieve the data including the identifying coordinates and generate for display (e.g., via a holographic interface) a holographic structure representing, for example, a person.

Holographs may be generated for display through the use of holographic interfaces using numerous techniques. In one example, a hologram is composed of light interference patterns recorded on a medium (e.g., a holographic film). To generate the light interference patterns on the film, a light source is split into multiple beams and scattered off an object and a recording medium. As a result of the scattering, the light beam becomes out of phase, which gives rise to holographic "fringes" recorded an the medium. When light is subsequently applied to the medium at a holographic interface, the fringes provide three-dimensional depth. As used herein, a "holographic interface," is any device capable of generating for display holographic media content. For example, in some embodiments, a holographic interface may include user devices (e.g., a cable box, television, smartphone, computer, tablet, art piece, household electronic device, etc.) that may incorporate an appropriate medium for generating a display of holographic media content.

By using a recording medium that is dynamically updatable (e.g., may reproduce multiple recorded light fields in series), a media guidance application may generate a holographic media asset or a holographic structure at a holographic interface. Photorefractive polymers, which may be used as dynamically updatable recording mediums, are described in greater detail in Blanche et, al., "Holographic three-dimensional telepresence using large-area photorefractive polymer," Nature, 468, 80-83 (Nov. 4, 2010), which is hereby incorporated by reference herein in its entirety.

The creation and manipulation of holograms is also discussed in greater detail in Marlow et al., U.S. Patent Pub. No. 2012/0090005, published Apr. 12, 2012; Lawrence et al., U.S. Patent Pub. No. 2011/0251905, published Oct. 13, 2011; Salter et al., U.S. Patent Pub. No. 2013/0321462, published Dec. 5, 2013; and Jensen et al. U.S. patent application Ser. No. 13/961,145, filed Aug. 7, 2013; which are hereby incorporated by reference herein in their entireties.

In some embodiments, content may be presented as virtual. Virtual content refers to content that does not physically exist, or does not have a physical relationship to an object that physically exists, but is made to appear to be physically existing, or made to appear to have a physical relationship to an object that physically exists, by the media guidance application. For example, the media guidance application may present content that appears to be a physically existing object (e.g., a virtual television screen) overlaid on an actual physically existing object (e.g., a real world wall, table, floor, ceiling, billboard, etc.) or floating freely before a user. Furthermore, the media guidance application may present content that appears to a user to be fixed to the physically existing object. For example, the media guidance application may present a virtual display screen such that the display screen appears to be incorporated into a physically existing wall.

In some embodiments, content is given the appearance of physically existing (i.e., being virtual) through the use of user optical devices. As referred to herein, a "user optical device" is an optical head-mounted display through which a user may perceive both physically existing content and content generated by the media guidance application. For example, a user optical device may be fashioned as traditional headwear (e.g., glasses, visors, goggles, masks, etc.) that includes heads-up display features. Each user optical device features a heads-up display (i.e., a transparent display that presents data without requiring users to look away from their usual viewpoints) that allows a user to perceive both physically existing objects (e.g., real world objects) and virtual objects (e.g., objects generated by the media guidance application that appear to be physically existing). Typically, the heads-up display is incorporated into the lens (or a corresponding feature) of the user optical device such that a user may perceive virtual content anywhere within the field of vision of the user (and virtual content may be overlaid on any object within the field of vision of the user).

Additional disclosure of embodiments related to the presentation of virtual content using optical user devices is described in Klappert et al., U.S. patent application Ser. No. 14/143,899, filed Dec. 30, 2013, which is hereby incorporated by reference in its entirety. It should be noted that throughout this disclosure embodiments related to holographic media content may also be applied to virtual content and/or any other type of media content.

In some embodiments, holographic interfaces and user optical devices may be referred to as user equipment devices. Different user equipment devices and their features were discussed above.

In some embodiments, the media guidance application may also present holographic structures through the use of a camera and/or projector. As referred to herein, the term "holographic structure" refers to any three-dimensional image that represents an object associated with a media asset. In some embodiments, the term holographic structure may refer to a holographic three-dimensional image that represents an object associated with a media asset. Still in other embodiments, the holographic structure may be a three-dimensional image representing an object to be viewed through a virtual reality head-mounted display (e.g., Oculus Rift®). For example, a holographic structure may be any virtual content. A holographic projector may cause a holographic structure to appear at a particular location. The media guidance application may then determine whether or not the holographic structure is to be modified (as discussed below) in response to detecting user interactions at that location.

As referred to herein, the term "user interaction" refers to any user motion directed at the holographic interface. For example, user interactions include touching, kicking, punching, ripping, pushing, pulling, pulling apart, stomping, etc. The media guidance application may detect a user interaction in several ways. For example, the media guidance application may detect a speed of a user interaction with respect to the holographic structure. Based on the speed, the media guidance application may determine that a specific motion is, for example, a push instead of a touch. In some embodiments, the media guidance application may calculate a force of the user interaction and based on the force of the user interaction determine that a particular user interaction occurred. For example, if a media guidance application determines that a user used his foot to interact with the holographic structure, the media guidance application may determine that the user used very little force during the contact (e.g., tapped the holographic structure). As a result, the media guidance application may not modify the holographic structure. In contrast if the media guidance application determines that a threshold amount of force was used by the user, the media guidance application may determine that the user kicked the holographic structure and thus, determine that a user interaction that requires modification of the holographic structure occurred.

In some embodiments, the media guidance application may determine the amount of force used by the user based on the velocity of the user's motion and the portion of the user's mass interacting with the holographic structure. The media guidance application may determine the mass of different portions of the user based on their size. For example, the media guidance application may use a camera in order to analyze several images of the user (e.g., from different angles). Based on the images, the media guidance application may determine the size of different body parts belonging to the user. The media guidance application may then calculate the mass of the body parts based on the size.

In some embodiments, the media guidance application may monitor (e.g., via user input interface 310 FIG. 3) the user and/or area about the holographic interface for user interactions that may cause the media guidance application to modify the holographic structure. For example, the media guidance application may detect that a user made a specific motion with respect to the holographic interface and that the motion was directed to the holographic structure. The media guidance application may make the detection by monitoring the user's movements with a camera/projector system. The media guidance application may project the holographic structure to be located at a certain distance from the camera/projector system. As described above, the holographic structure may have identifying coordinates associated with it. The media guidance application may project the holographic structure according to the identifying coordinates. The media guidance application may track the user with the camera and compare the user's coordinates to those of the holographic structure. If some coordinates of the user and some coordinates of the holographic structure match, the media guidance application may determine that the user is interacting with the holographic structure.

In some embodiments, the media guidance application may generate for display a holographic structure in such a way that the holographic structure appears within a camera's view. In this case, the media guidance application may use the camera to track the user and to determine when portions of the holographic structure and portions of the user (e.g., user's hands) are in the same location. At this point, the media guidance application may determine that the user is interacting with the holographic structure.

Once the media guidance application determines that the user is interacting with the holographic structure, the media guidance application may monitor for specific interactions. For example, the media guidance application may detect a user's hands are moving in a "ripping" motion. The media guidance application may query a database listing different motions and the corresponding modifications to the holographic structure. To continue with the example above, the media guidance application may query the database and determine that a ripping motion corresponds to a modification of splitting the holographic structure apart.

In some embodiments, the media guidance application may not modify certain holographic structures in response to certain motions. For example, if the holographic structure is a geometric shape (e.g., pyramid, sphere, cube), the media guidance application may modify the holographic structure in response to all available motions (e.g., rip, kick, punch, pull, push, pull apart, etc.). However, if the holographic structure is a puppy, the media guidance application may not modify (e.g., split apart) the puppy in response to a kicking motion. This feature may be desired as part of a parental control system. The media guidance application may determine a motion via a use of the camera. For example, the media guidance application may detect a ripping motion by detecting that a user has put two hands together while interacting with the holographic structure with two hands. The media guidance application may make the detection by analyzing images from the camera to determine if the coordinates of the holographic structure and the user's hands, as determined from the images from the camera, intersect. The media guidance application may then analyze subsequent images from the camera in order to determine if the user's hands are moving in opposite directions to each other and how far apart the hands have moved. If the media guidance application determines that the hands moved far enough apart (e.g., enough to rip a portion of the holographic structure), the media guidance application may proceed to determine whether the holographic structure is to be modified.

The media guidance application may have more complex techniques in order to detect some motions. For example, if the media guidance application determines that a user interacted with the holographic structure, the media guidance application may need to determine whether the user in fact "pushed" the holographic structure or just touched it. The media guidance application may make that determination by detecting (e.g., via the camera) where the motion begins and ends in relation to the holographic structure. For example, if the media guidance application detects that the user starts the motion on one side of the holographic structure and ends the motion on the opposite side of the holographic structure, the media guidance application may determine that the user applied a "pushing" motion to the holographic structure. If however, the media guidance application detects that the user interacted with the holographic structure in a way that the user's motion ended on the surface of the holographic structure or near the surface of the holographic structure, the media guidance application may detect that the user "touched" the holographic structure and in response not apply a modification to the holographic structure.

The media guidance application may also use the speed of the motion to determine whether the media guidance application needs to apply a modification to the holographic structure. For example, if the user is interacting with the holographic structure by putting a palm of her hand on the structure, the media guidance application may determine, using the speed of the movement, whether the "palm placing" motion is a true push or just a "touch". If the speed of the "palm placing" motion reaches a certain threshold value, the media guidance application may determine that the user pushed the holographic structure.

Figure 5:
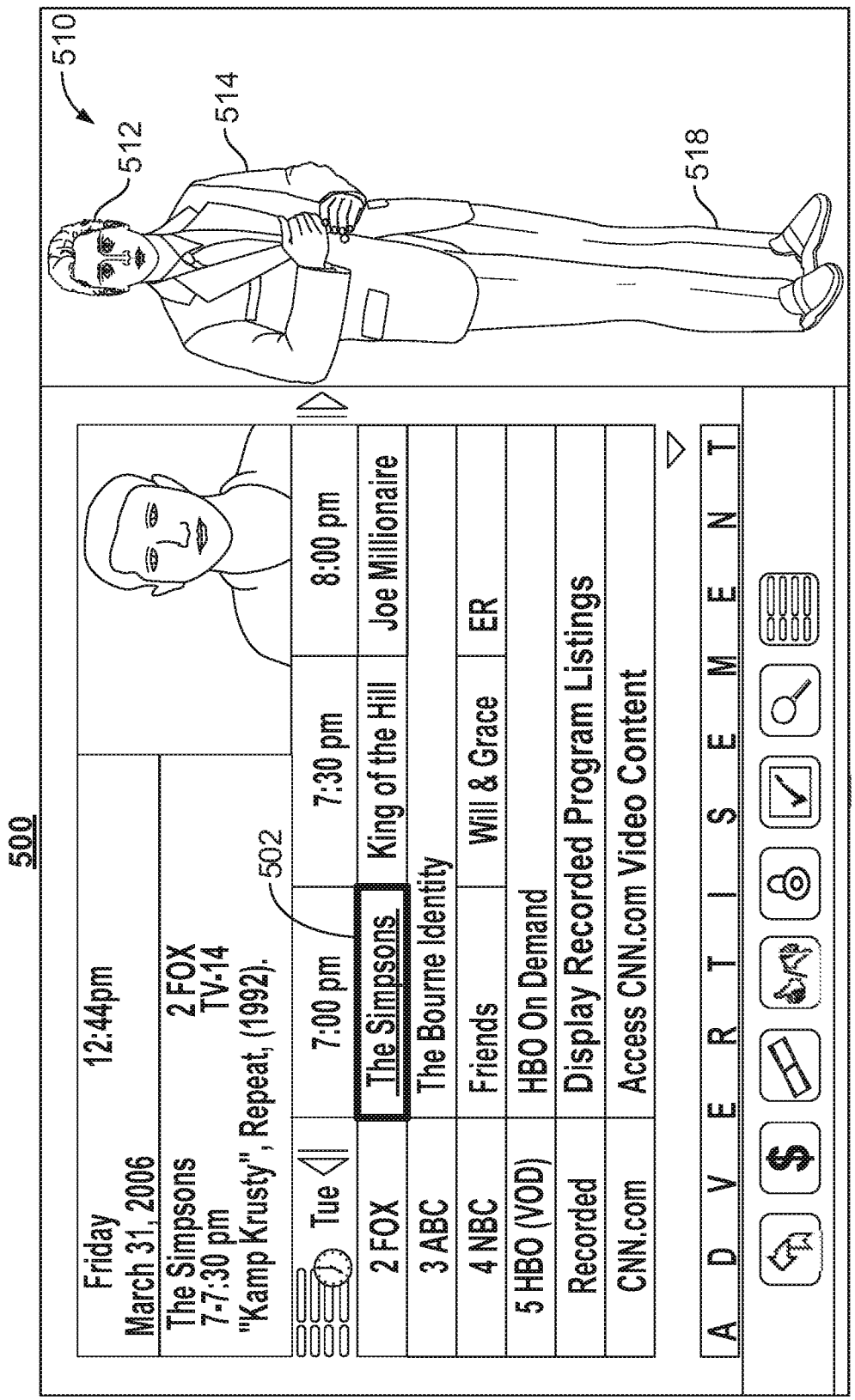
FIG. 5 is an illustrative example of a holographic structure appearing near a media guidance display presented in accordance with some embodiments of the disclosure.

FIG. 5 illustrates an example of a media guidance application generating for display a holographic structure. The media guidance application may generate for display holographic structure 510 by using a holographic interface. Holographic interface may be any user equipment (e.g., user equipment 402, 404 or 406 (FIG. 4)). Holographic structure 510 may represent a person associated with a media asset (e.g., an actor in a movie, host of a talk show, etc.). Holographic structure 510 may have associated portions. For example, item 512, 514, and 518 represent the person's body parts. The media guidance application may detect user interactions with a specific portion (e.g., body part). Item 502 represents a media asset identifier corresponding to a media asset that the holographic structure is associated with.

In some embodiments, the media guidance application may detect a pulling motion with respect to portion 514 and, responsive to the pulling motion, the media guidance application may cause the user to perceive that portico 514 has been severed from the holographic structure. In another example, the media guidance application may detect a pulling apart motion with respect to portion 512 and in response, the media guidance application may cause the user to perceive portion 512 to split. After the media guidance application causes portion 512 to be perceived as split apart, the media guidance application may generate for display a media asset between the two parts of portion 512. The media asset may be information associated with the person. For example, if a person is an actor in a movie, the media guidance application may present to the user the person's biographical information. In another embodiment, the media guidance application may present a list of media assets that feature the person. The media guidance application may then allow a user to select one of the media assets for consumption.

In another embodiment, the media guidance application may present different media assets based on the portion of the holographic structure that the user interacted with. For example, if the media guidance application detects that the user interacted with portion 512 of the holographic structure, the media guidance application may generate for display biographical information associated with the person represented by the holographic structure. If the media guidance application detects a user interaction with portion 514 of the holographic structure, the media guidance application may generate for display media assets in which the represented person featured. Furthermore, if the media guidance application detects that the user interacted with portion 518 of the holographic structure, the media guidance application may generate for display media assets in which the person represented by the holographic structure was a lead actor.

In another embodiment, the media guidance application may generate for display media assets based on popularity among other users and also based on the portion of the holographic structure that the user interacted with. For example, if the user interacted with portion 512, the media guidance application may generate for display media asset identifiers for the most popular media assets associated with the holographic structure. If the media guidance application detects that the user interacted with portion 514, the media guidance application may generate for display media asset identifiers associated with less popular media assets. If the media guidance application detects that the user interacted with portion 518 of the holographic structure, the media guidance application may generate for display media asset identifiers of the least popular media assets.

In some embodiments, in response to the user interaction, the media guidance application may increase the holographic structure's perceived surface area while maintaining the holographic structure's perceived volume. The media guidance application may increase the holographic structure's surface area by changing a coordinate of the set of coordinates that identifies the holographic structure. For example, if the media guidance application uses a camera to track the user, the media guidance application may detect, via the camera, that the user applied a pulling apart motion to the holographic structure. In response, the media guidance application may modify the proper coordinates in order to modify the holographic structure in a way that the user perceives the holographic structure to be split apart. For example, the media guidance application may apply a modification to the holographic structure that will make the holographic structure be perceived as split in half. For example, if the holographic structure is a sphere, the sphere may be perceived as split into two equal parts. The media guidance application may fill in the two surface areas of the two new dome structures with the same textures as the other surfaces of the two structures.

In some embodiments, the media guidance application may generate for display a holographic structure that represents a plant. If the media guidance application detects that a pulling motion has been applied to a portion of the holographic structure, the media guidance application may apply a modification to the holographic structure that makes the portion of the holographic structure to be perceived as severed from the holographic structure. As defined herein, "a portion of a holographic structure" is a part of a holographic structure that is distinguishable from other parts of the holographic structure. For example, if the holographic structure represents a person or an animal, each visible body part (e.g., arm, leg, head, etc.) may be a portion of the holographic structure. If the portion of the holographic structure is a plant, each branch of the plant may be a portion the holographic structure.

In some embodiments, the media guidance application may detect that a user used a "pulling apart" motion with respect to the holographic structure. In response, the media guidance application may modify the holographic structure to split apart the surface of the holographic structure to reveal a media asset being presented inside. For example, the media guidance application may generate for display a wall with curtains in front of the wall. The media guidance application may detect that a user has used a "pulling apart" motion to spread the curtains. As a result, the media guidance application may modify the holographic structure to be perceived by the user as the window curtains being spread apart. The media guidance application may generate for display a media asset in the space form whence the curtains have been spread apart from.

In some embodiments, the media guidance application may detect a combination of motions with respect to the holographic structure. For example, the media guidance application may generate for display a holographic structure that represents a bookshelf with books on it. The media guidance application may determine that the user reached into the bookshelf and grabbed a book from the bookshelf. The media guidance application may determine that this combination of motions "reaching in" and "grabbing" constitute a user interaction with the holographic structure such that the media guidance application is to modify the holographic structure. The media guidance application may cause the holographic structure to be perceived as if a book is being "severed" from the holographic structure. The media guidance application may generate for display the contents of the book (e.g., page by page) in response to the motion.

In some embodiments, the media guidance application may generate for display a media asset associated with the holographic structure. For example, the media guidance application may access a database listing holographic structures and corresponding media assets. The media guidance application may retrieve from the database a media asset associated with the holographic structure. Additionally or alternatively, the media guidance application may retrieve multiple media assets associated with the holographic structure. The media guidance application may choose to generate for display one of the retrieved media assets based on specific criteria. For example, the release dates of the media assets, popularity of media assets among other users, user's preferences retrieved from a user's profile, etc. In another embodiment, the media guidance application may generate for display media asset identifiers associated with the retrieved media assets so the user may select a media asset for consumption.

In some embodiments, the media guidance application may detect that the user interacted with a particular portion of the holographic structure. For example, if the holographic structure represents a person, the media guidance application may determine (e.g., by the use of a camera) that the user performed a "pulling apart" motion with respect to the person's head. The media guidance application may then modify the person's head to split it apart and generate for display a media asset in between the split portions of the person's head.

In some embodiments, the media guidance application may detect a ripping motion, a striking motion, a pushing motion, a pulling motion or a pulling apart motion. For example, the media guidance application may monitor the user and user's movements via a camera. The media guidance application may compare the user's movements with a set of movements stored in a database. For example, a pulling apart motion starts with the user's hands in one position. As the motion progresses, the user's hands move apart further and further. At some point, the user's hands stop moving apart. The media guidance application may detect that movement and compare it with the motions stored in the database. If the motions match, the media guidance application may proceed to determine what kind of modification corresponds to this particular motion.

In some embodiments, the media guidance application may detect that a user of the holographic interface is using two hands in the proximity of the holographic interface to make a ripping motion with respect to the holographic structure. As a result of the detection, the media guidance application may cause the holographic structure to appear to the user as split apart. The media guidance application may also detect a striking motion in the proximity of the holographic interface. In response, the media guidance application may cause a portion of the holographic structure to be detached from the full holographic structure. In yet another example, the media guidance application may detect a pulling motion and, as a result, may cause multiple portions of the holographic structure to be perceived to be split from the holographic structure. In yet another example, if the media guidance application detects a pushing motion, the media guidance application may cause the holographic structure to appear to not only split apart, but to also cause the holographic structure to change the locations of the split portions.

In some embodiments, the media guidance application may cause the user to perceive the holographic structure to be torn apart in response to the user interaction with the portion of the holographic structure. For example, if the holographic structure represents a loaf of bread and the media guidance application detects a "ripping" motion from the user with respect to the loaf of bread, the media guidance application may modify the loaf of bread to now be perceived as two holographic structures corresponding to the two ripped portions. If the holographic structure represents a plant and the media guidance application detects a ripping or a pulling motion with respect to one branch of the plant, the media guidance application may cause the plant to be modified such that the branch of the plant that was pulled or ripped is perceived to be severed from the rest of the plant.

In some embodiments, increasing the holographic structure's surface area while maintaining the holographic structure's volume, by changing a coordinate of the set of coordinates that identifies the holographic structure, refers to increasing the holographic structure's perceived surface area and the holographic structure's perceived volume. For example, the media guidance application may detect a user interaction with respect to the holographic structure and in response to the user interaction determine that a modification to the holographic structure is needed. As a result, the media guidance application may cause the user to perceive that holographic structure's volume has not changed, but as part of the modification the media guidance application may modify the holographic structure's volume, by adjusting at least one coordinate of the set of coordinates. After the media guidance application increases or decreases the volume, the media guidance application may return the volume back to the original size.

In some embodiments, the media guidance application may cause the user to perceive the holographic structure to be partially torn apart in response to the user interaction with the portion of the holographic structure. For example, if the holographic structure represents a sheet of paper the media guidance application may determine that a ripping motion only affects the top half of the paper that has been ripped. The media guidance application may determine whether to cause the holographic structure to be perceived to partially or fully split apart based on the type of user interaction and/or based on the velocity of the user interaction.

In some embodiments, the media guidance application may identify a type of user interaction. As referred to herein, the term "type of a user interaction" refers to a type of motion by a user with respect to the holographic interface. For example, a type of a user interaction may include a ripping motion, a striking motion, a pushing motion, a pulling motion, a kicking motion, etc. Additionally or alternatively, a type of a user interaction may include a combination of different motions (e.g., reach and pull). Each motion may be associated with sub-types. As referred to herein, a "sub-type" of a user interaction refers to any motion that is made with the same body part of the user and that involves similar motions. For example, a striking motion may include a punch with a closed fist, a punch with an open palm, a chopping motion, etc. A kicking motion may include a push kick, roundhouse kick, a side kick, a back kick, a stomp, etc. As described above, the media guidance application may identify the type of user interaction by comparing the motions or movements of the user with a set of user movements or motions in a database corresponding to specific user interactions.

In some embodiments, the media guidance application may cross-reference the type of user interaction with a database listing types of user interactions that correspond to modifications to the holographic structure to determine whether to increase the holographic structure's perceived surface area while maintaining the holographic structure's perceived volume. As discussed above, the media guidance application may access a database that may reside in storage 308 (FIG. 3), media guidance data source 418 (FIG. 4) or media content source 416 (FIG. 4). It should be noted that the database may be located on any user equipment or server that is accessible by the media guidance application. As the media guidance application monitors for user interactions, the media guidance application may detect different user interactions. The media guidance application may compare each user interaction with entries in the database discussed above in order to determine whether to modify the holographic structure.

In some embodiments, the media guidance application may determine, through the comparison, that a user interaction corresponds to multiple modifications. The media guidance application may then retrieve from the database a list of possible modifications. The media guidance application may then determine which modification to apply to the holographic structure. The media guidance application may make the determination based on, for example, the number of media assets associated with the holographic structure. For example, in some embodiments the media guidance application may retrieve two modifications corresponding to a pulling apart motion. One modification may correspond to the media guidance application causing the user to perceive that a portion of the holographic structure is torn apart. A second modification may correspond to the media guidance application causing the user to perceive that the holographic structure has been torn in two. If, for example, the media guidance application determines by, for example, accessing a database described above, that only two media assets are associated with the holographic structure, then the media guidance application may only cause the user to perceive that only a portion of the holographic structure is split apart. If, for example, the media guidance application determines that ten media assets are associated with the holographic structure, the media guidance application may cause the user to perceive that the holographic structure has fully split into two holographic structures.

In some embodiments, the media guidance application may cross-reference a velocity with a database listing velocities of user interactions which in turn correspond to modifications to the holographic structure to determine whether to increase the holographic perceived structure's surface area while maintaining the holographic structure's perceived volume. As referred to herein, the term "velocity of the user interaction" refers to speed and direction of a motion by a user with respect to the holographic interface. For example, the media guidance application may detect that a user is using his hands to perform a pushing motion. The media guidance application may determine the direction of the motion (e.g., straight forward, a number of degrees in one direction, etc.). The media guidance application may also determine the speed of the motion in order to determine the velocity. In another example, the media guidance application may detect that a user performed a ripping motion with respect to a holographic structure. The media guidance application may detect the velocity of the ripping motion. The media guidance application may detect a starting point of the ripping motion to be where the user's hands are close together with respect to each other and also share some of the coordinates identifying a portion of the holographic structure. The media guidance application may also detect when the ripping motion has come to an end by detecting when the user's hands are furthest apart with respect to each other and when the user's hands are no longer sharing any coordinates with the holographic structure. The media guidance application may further calculate the amount of time between the start of the motion and the end of the motion. Based on those factors, the media guidance application may determine the speed of the user interaction. The media guidance application may also detect direction of the user interaction by comparing the starting coordinates and the ending coordinates of the user interaction. The media guidance application may calculate velocity based on direction and speed.

Once the media guidance application determines the velocity of the user interaction, the media guidance application may determine whether to modify the holographic structure based on the velocity. In some embodiments, the media guidance application may retrieve a threshold velocity from a database. The database may be the same database as discussed above with regard to user interactions. The database may also be a different database residing at a different location. If the threshold velocity value has been reached, the media guidance application may perform the modification. As referred to herein, the term "threshold velocity value" refers to a direction and a minimum speed of a user interaction in order for a media guidance application to modify a holographic structure. If the media guidance application determines that the threshold velocity value has not reached the threshold, the media guidance application will not modify the holographic structure. The velocity threshold value may be preset by the manufacture of the user equipment or by the content provider. Alternatively or additionally, the threshold velocity value may be set by a user. In yet another example, the media guidance application may set the velocity threshold value based on user demographics. For example, a user that is younger than five years old may have much slower interactions than a user that is twenty years old. The media guidance application may adjust the threshold velocity value accordingly. As a result, adjusting the threshold velocity value may improve the accuracy of detection of user interactions for different users.

In some embodiments, the media guidance application may cross-reference the holographic structure with a database listing media assets associated with holographic structures to determine the media asset to generate for display. For example, the media guidance application may access a database and retrieve from the database a media asset associated with the holographic structure. In some embodiments, the media guidance application may retrieve from the database multiple media assets associated with the holographic structure. The media guidance application may select a media asset to be generated for display based on the media asset's popularity among other users, release date of the media asset, user's likely rating for the media asset, user preferences within a user profile, or a random selection.

In some embodiments, after increasing the holographic structure's perceived surface area while maintaining the holographic structure's perceived volume, the media guidance application may automatically decrease the holographic structure's perceived surface area back to the original size while maintaining the holographic structure's perceived volume based on a threshold time. For example, the media guidance application may have caused the user to perceive the holographic structure to be torn apart. The media guidance application may, after a threshold time, cause the holographic structure to be perceived as put back together. The threshold time may be calculated based on the media asset that the media guidance application selected to present to the user. For example, if a media asset has a length (e.g., a movie, trailer, advertisement, etc.), the media guidance application may determine the threshold time based on the length of the media asset. In yet another example, the media asset may be something that may be read (e.g., a book, a magazine article, etc.). The media guidance application may present the media asset in portions (e.g., pages of a book). In this instance, the media guidance application may track the user's eyes, and when the media guidance application determines that the user has finished reading one portion, the media guidance application may present another portion to the user. The threshold time may be preset by a manufacturer of the user equipment on which the media guidance application is active, or a content provider. The media guidance application may also receive the threshold time from a user and store the value in the user's profile. The threshold time may also be dynamic. As discussed above, the media guidance application may not cause the holographic structure to be perceived as put back together until the media asset has ended or otherwise does not need to be presented anymore.

In some embodiments, the media guidance application may receive a request for a plurality of holographic structures, where each holographic structure of the plurality of holographic structures corresponds to a respective media asset. The media guidance application may present to the user a plurality of media asset identifiers. The media guidance application may monitor for a user to select a media asset identifer. When the media guidance application receives a user selection of a media asset identifier, the media guidance application may generate for display a holographic structure associated with the media asset identifer. The media guidance application may further monitor for other user selections of other media asset identifiers. The media guidance application may generate for display a holographic structure associated with each media asset identifier. The media guidance application may then monitor for user interactions with each holographic structure. The media guidance application may, in response to a user interaction with a particular holographic structure, generate for display information about the media asset associated with the holographic structure. The information may include directors, actors, topics, etc., associated with the media asset.

In some embodiments, the media guidance application may monitor an area around which the holographic structure appears to a user to detect the user interaction. For example, if the media guidance application detects a pushing motion from the user, that motion may begin in an area perceived to be near the holographic structure (e.g., in front of the structure) and end in another area perceived to be near the holographic structure (e.g., the back of the holographic structure).

Figure 6:
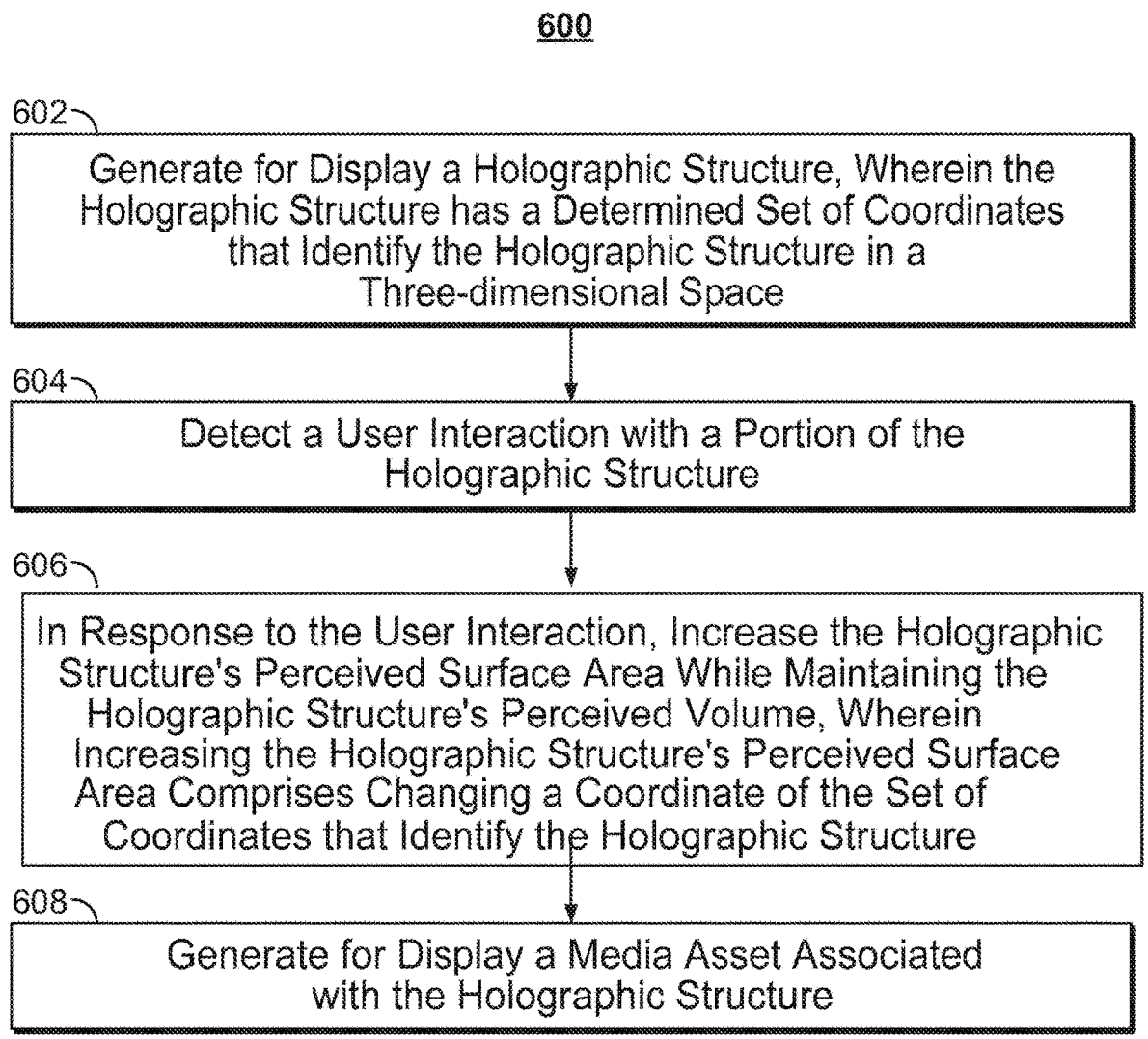
FIG. 6 is a flowchart of illustrative steps for providing media content associated with a holographic structure.
Figure 7:
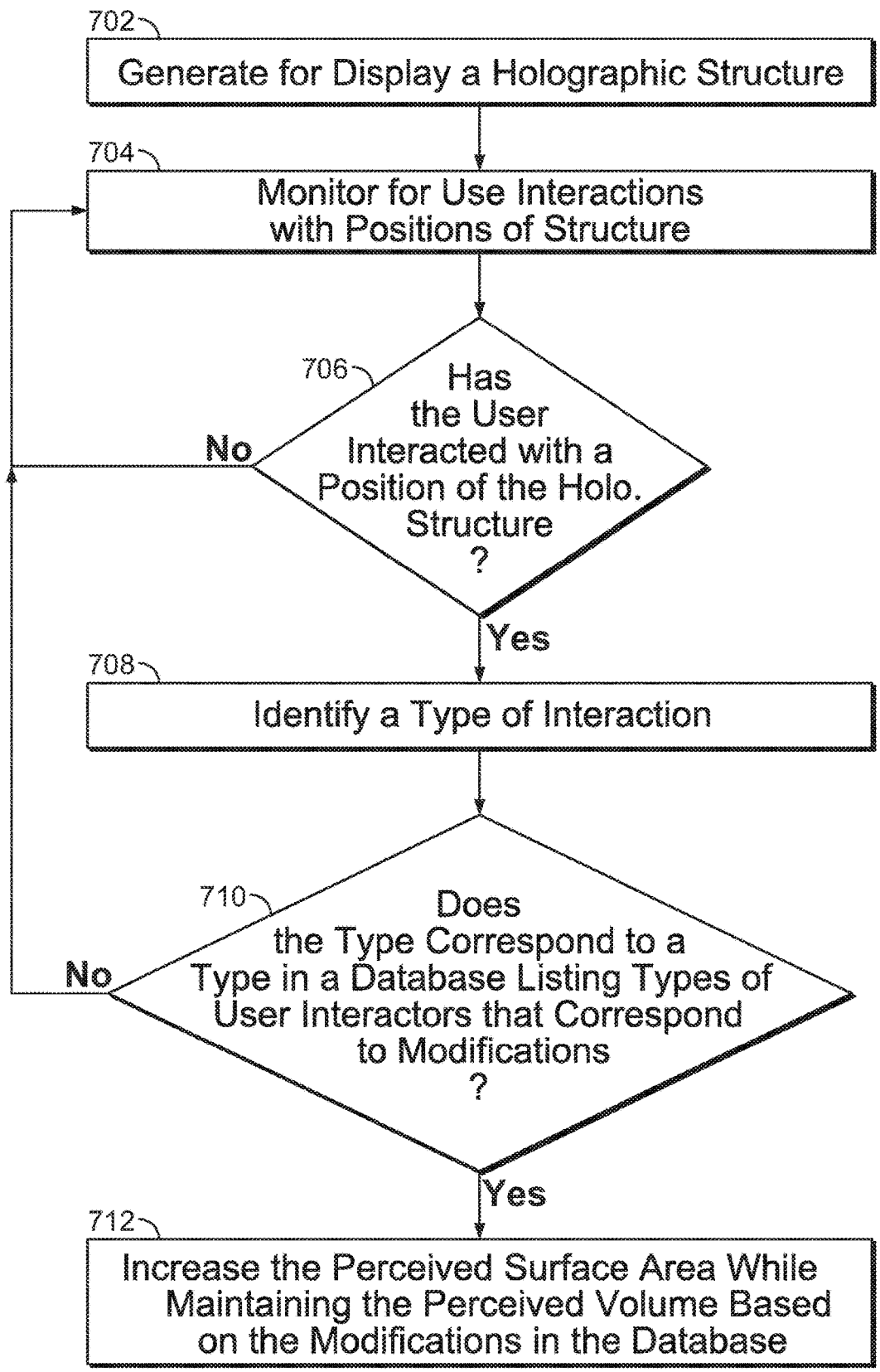
FIG. 7 is a flowchart of illustrative steps for increasing the perceived surface area of a holographic structure while maintaining the perceived volume of the holographic structure based on an entry in a database listing types of user interactions that correspond to modifications to the holographic structure.

FIG. 6 is a flowchart of illustrative steps for providing media assets associated with a holographic structure. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 600 may be incorporated into or combined with one or more steps of any other process or embodiment (e.g., process 700 (FIG. 7).

At 602, media guidance application generates for display (e.g., via control circuitry 304 (FIG. 3)) a holographic structure, where the holographic structure has a determined set of coordinates that identifies the holographic structure in a three-dimensional space. For example, the media guidance application may receive a user input via an interface (e.g., user input interface 310 (FIG. 3)) associated with a holographic interface (e.g., holographic interface 404 (FIG. 4)). In some embodiments, the user input may be received via a display screen (e.g., display 200 (FIG. 2)). For example, the holographic interface may include holographic interface circuitry (e.g., incorporated into and/or coupled to control circuitry 304 (FIG. 3)) configured to generate for display a holographic structure at a holographic interface. The media guidance application may instruct (e.g., via control circuitry 304 (FIG. 3)) the holographic media interface to generate for display a holographic structure by issuing instructions to the holographic interface circuitry.

At 604, the media guidance application detects (e.g., via control circuitry 304 (FIG. 3)) a user interaction with a portion of the holographic structure. For example, the media guidance application may detect (e.g., via user input interface 310 (FIG. 3)) a user interaction (e.g., a ripping motion, a pulling apart motion, and/or other user motion mimicking contact with holographic media content) about a holographic interface (e.g., holographic interface 402 (FIG. 4)). For example, the media guidance application may receive information indicating (e.g., at control circuitry 304 (FIG. 3) from user input circuitry) that a user interaction associated with a portion of the holographic structure was detected at the holographic interface.

At 606, the media guidance application, in response to the user interaction, increases (e.g., via control circuitry 304 (FIG. 3)) the holographic structure's perceived surface area while maintaining the holographic structure's perceived volume, where increasing the holographic structure's perceived surface area comprises changing a coordinate of the set of coordinates that identifies the holographic structure. For example, the media guidance application may detect where the user interaction (e.g., a ripping motion), in relation to the holographic structure, begins and ends. The media guidance application may detect (e.g., via user input interface 310 (FIG. 3)) that a ripping motion started at the top of the holographic structure and ended at the bottom of the holographic structure. The media guidance application may cause (e.g., via control circuitry 301 and display 312 (FIG. 3)) the user to perceive the holographic structure to be torn apart. It should be noted that display 312 may be a projector that projects the holographic structure into a three-dimensional space.

At 608, the media guidance application generates for display (e.g., via control circuitry 304 (FIG. 3)) a media asset associated with the holographic structure. For example, as described above, the media guidance application may receive a user input via an interface (e.g., user input interface 310 (FIG. 3)) associated with the holographic interface (e.g., holographic interface 404 (FIG. 4)) or via an interface associated with another device (e.g., user equipment 402 (FIG. 4)). In some embodiments, the user input may be received via a display screen (e.g., display 200 (FIG. 2)). For example, the holographic interface may include holographic interface circuitry (e.g., incorporated into and/or coupled to control circuitry 304 (FIG. 3)) configured to generate for display holographic media assets at a holographic interface. The media guidance application may instruct (e.g., via control circuitry 304 (FIG. 3)) the holographic interface to generate for display holographic media assets by issuing instructions to the holographic interface circuitry.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

FIG. 7 is a flowchart of illustrative steps for increasing the perceived surface area of a holographic structure while maintaining the perceived volume of the holographic structure based on an entry in a database listing types of user interactions that correspond to modifications to the holographic structure. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 700 may be incorporated into or combined with one or more steps of any other process or embodiment (e.g., process 600 (FIG. 6)).

At 702, media guidance application generates for display (e.g., via control circuitry 304 and display 312 (FIG. 3)) a holographic structure. As described above, the holographic structure may be associated with a set of coordinates that identifies the holographic structure.

At 704, the media guidance application monitors (e.g., via control circuitry 304 (FIG. 3)) for user interactions with portions of the holographic structure. The media guidance application may use user input interface 312 (FIG. 3) in order to monitor user interactions with portions of the holographic structure. In some embodiments, the media guidance application may use a camera or multiple cameras to detect the location of a user in relation to the holographic structure. The media guidance application may extrapolate, from the images received from the camera or from the multiple cameras, the coordinates of the user and compare the extrapolated coordinates with the coordinates of the holographic structure in order to determine if the user is interacting with the holographic structure. Additionally or alternatively, the media guidance application may generate for display a holographic structure and adjust the direction of the camera so that the camera is always pointed at the holographic structure. The media guidance application may then detect when a user comes into the camera's field of view and also determine when a user interacts with the holographic structure. If multiple cameras are used, the media guidance application may detect user interactions more accurately. For example, the cameras may be placed at different angles so that the user does not block any single camera.

At 706, the media guidance application determines (e.g., via control circuitry 304 (FIG. 3)) whether the user interacted with a portion of the holographic structure. The media guidance application may perform the determination the same way as in 704. For example, the media guidance application may cross-reference user movements with a database listing user movements and corresponding interactions. The database may reside in storage 308 (FIG. 3) or at any location accessible via communications network 414 (FIG. 4). The media guidance application may detect a movement and coordinates in a three-dimensional space associated with the moving (e.g., starting position and ending position). The media guidance application may then query the database and provide to the database a set of coordinates corresponding to the user's movement. The database may perform a search and respond to the media guidance application with a result. Alternatively or additionally, the media guidance application may query the database for all user interactions and corresponding movements. The media guidance application may then compare (e.g., via control circuitry 304 (FIG. 3)) the user's movement with the movements corresponding to the user interaction. If the media guidance application finds a match, the media guidance application determines that a user interaction has been detected.

At 708, the media guidance application identifies (e.g., via control circuitry 304 (FIG. 3)) a type of user interaction. The media guidance application may access the same database as at 706 in order to identify the type of user interaction. The media guidance application may identify the type of user interaction in the same manner as it identifies whether the user interaction was detected. Once the media guidance application detects the user interaction it may access a database that cross-references types of user interactions and which user interactions correspond to which type. The media guidance application may transmit to the database the user interaction and receive back from the database the type of the user interaction. In some embodiments, the media guidance application may detect the type of user interaction based on the motion performed by the user. If the media guidance application detects a leg motion from the user with respect to the holographic structure, the media guidance application, based on the speed of the motion, the starting point, and the ending point, determines, that a motion is a kick. The media guidance application may further determine from the shape of the motion what kind of kick it is. For example, a roundhouse kick has a distinct shape that the media guidance application may detect.

At 710, the media guidance application determines (e.g., via control circuitry 304 (FIG. 3)) whether the type of user interaction corresponds to a type in a database listing types of user interactions that corresponds to modifications of the holographic structure. For example, the media guidance application may access a database and transmit to the database the type of user interaction that the media guidance application detected. The database may reside at any location described above (e.g., storage 308, media guidance data source 418, media content source 416, or any other location reachable via communications network 414. The media guidance application may receive from the database a response as to whether the user interaction detected corresponds to a modification. If the response is negative, the process moves to 704. If the response is positive, the process moves to 712.

At 712, the media guidance application increases (e.g., via control circuitry 304 (FIG. 3)) the holographic structure's perceived surface area while maintaining the holographic structure's perceived volume, where increasing the holographic structure's surface area comprises changing a coordinate of the set of coordinates that identifies the holographic structure. The media guidance application may retrieve from the database a set of coordinates corresponding to the modified holographic structure. The media guidance application may then compare the retrieved coordinates with the coordinates identifying the holographic structure. The media guidance application may determine, via the comparison, which coordinates need to change in order for the modification to occur. The media guidance application may then change the coordinates in order to cause the modification to be perceived by the user.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. Furthermore, it should be noted that any of the devices or equipment discussed in relation to FIGS. 3-5 could be used to perform one or more of the steps in FIG. 6.

It will be apparent to those of ordinary the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, determination of media asset ranking may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the media asset attributes as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing identifiers of media assets, the method comprising:
   generating for display a holographic structure, wherein the holographic structure represents a tangible object featured in a media asset;
   detecting a user interaction with a portion of the holographic structure that represents a portion of the tangible object; and
   in response to the user interaction:
      identifying a plurality of media assets in which the tangible object is featured, wherein the plurality of media assets includes the media asset;
      automatically modifying at least a portion of the holographic structure to represent a corresponding portion of the tangible object as opened; and
      automatically generating for display, within the holographic structure, an identifier of each media asset of the plurality of media assets.

2. The method of claim 1, wherein the holographic structure is an animal and wherein the portion of the holographic structure generated for display as opened is a mouth of the animal.

3. The method of claim 1, further comprising:
   identifying a type of the user interaction; and
   cross-referencing the type of user interaction with a database listing types of user interactions that correspond to modifications of the holographic structure to determine whether to generate for display the at least a portion of the holographic structure as opened.

4. The method of claim 1, further comprising monitoring for a second user interaction with an identifier of a media asset of the plurality of media assets.

5. The method of claim 4, further comprising:
   in response to a threshold amount of time passing without detection of the second user interaction, automatically generating for display the at least a portion of the holographic structure as closed.

6. The method of claim 1, further comprising monitoring an area around which the holographic structure appears to a user to detect the user interaction.

7. The method of claim 1, wherein identifying the plurality of media assets comprises cross-referencing the holographic structure with a database listing media assets associated with holographic structures to determine the plurality of media assets.

8. The method of claim 1, further comprising, in response to the user interaction, increasing the holographic structure's surface area while maintaining the holographic structure's volume.

9. The method of claim 8, wherein:
   the holographic structure has a determined set of coordinates that identifies the holographic structure in three-dimensional space; and
   wherein increasing the holographic structure's surface area comprises changing a coordinate of a set of coordinates.

10. A system for providing identifiers of media assets, the system comprising:
    storage circuitry configured to store a holographic structure; and
    control circuitry configured to:
    generate for display the holographic structure, wherein the holographic structure represents a tangible object featured in a media asset;
    detect a user interaction with a portion of the holographic structure that represents a portion of the tangible object; and
    in response to the user interaction:
       identify a plurality of media assets in which the tangible object is featured, wherein the plurality of media assets includes the media asset;
       automatically modify at least a portion of the holographic structure to represent a corresponding portion of the tangible object as opened; and
       automatically generate for display, within the holographic structure, an identifier of each media asset of the plurality of media assets.

11. The system of claim 10, wherein the holographic structure is an animal and wherein the portion of the holographic structure generated for display as opened is a mouth of the animal.

12. The system of claim 10, wherein the control circuitry is further configured to:
    identify a type of the user interaction; and
    cross-reference the type of user interaction with a database listing types of user interactions that correspond to modifications of the holographic structure to determine whether to generate for display the at least a portion of the holographic structure as opened.

13. The system of claim 10, wherein the control circuitry is further configured to monitor for a second user interaction with an identifier of a media asset of the plurality of media assets.

14. The system of claim 13, wherein the control circuitry is further configured to:

in response to a threshold amount of time passing without detection of the second user interaction, automatically generate for display the at least a portion of the holographic structure as closed.

15. The system of claim 10, wherein the control circuitry is further configured to monitor an area around which the holographic structure appears to a user to detect the user interaction.

16. The system of claim 10, wherein the control circuitry is configured to identify the plurality of media assets by cross-referencing the holographic structure with a database listing media assets associated with holographic structures to determine the plurality of media assets.

17. The system of claim 10, wherein the control circuitry is further configured to, in response to the user interaction, increase the holographic structure's surface area while maintaining the holographic structure's volume.

18. The system of claim 17, wherein:
the holographic structure has a determined set of coordinates that identifies the holographic structure in three-dimensional space; and
wherein the control circuitry configured to increase the holographic structure's surface area is further configured to change a coordinate of a set of coordinates.

* * * * *